United States Patent [19]
Ghisellini et al.

[11] Patent Number: 5,468,809
[45] Date of Patent: Nov. 21, 1995

[54] POLYOLEFIN COMPOSITIONS HAVING GOOD TRANSPARENCY AND IMPACT RESISTANCE

[75] Inventors: Renato Ghisellini; Giuliano Cecchin; Decio Malucelli, all of Ferrara, Italy

[73] Assignee: Montell North America Inc., Wilmington, Del.

[21] Appl. No.: 322,850

[22] Filed: Oct. 13, 1994

Related U.S. Application Data

[63] Continuation of Ser. No. 21,365, Feb. 23, 1993, abandoned.

[30] Foreign Application Priority Data

Feb. 24, 1992 [IT] Italy ................... MI92A0401
Feb. 24, 1992 [IT] Italy ................... MU92A0402

[51] Int. Cl.$^6$ .................... C08L 23/10; C08L 23/16; C08L 23/20; C08L 23/04
[52] U.S. Cl. .................... 525/240; 525/88; 525/322
[58] Field of Search ................................ 525/240

[56] References Cited

U.S. PATENT DOCUMENTS

| | | | |
|---|---|---|---|
| 3,256,367 | 6/1966 | Jayne | 525/240 |
| 3,515,775 | 6/1970 | Combs et al. | 260/897 |
| 3,517,086 | 6/1970 | Shirayama et al. | 525/240 |
| 3,562,790 | 2/1971 | Coover et al. | 525/240 |
| 4,087,485 | 5/1978 | Huff | 260/897 |
| 4,113,806 | 9/1978 | Watson et al. | 260/897 |
| 4,221,882 | 9/1980 | Huff | 525/240 |
| 4,434,264 | 2/1984 | Ficker | 525/240 |
| 4,634,735 | 1/1987 | Thiersault et al. | 525/240 |
| 4,634,740 | 1/1987 | Fjuita et al. | 525/240 |
| 5,023,300 | 6/1991 | Huff et al. | 525/194 |

FOREIGN PATENT DOCUMENTS

| | | |
|---|---|---|
| 0120562 | 10/1984 | European Pat. Off. . |
| 0164190 | 12/1985 | European Pat. Off. . |
| 0373666 | 6/1990 | European Pat. Off. . |
| 0400333 | 12/1990 | European Pat. Off. . |
| 59-43043 | 3/1984 | Japan . |
| 61-098756 | 5/1986 | Japan . |
| 1065568 | 4/1967 | United Kingdom . |
| 1156813 | 7/1969 | United Kingdom . |

*Primary Examiner*—Carman J. Seccuro, Jr.

[57] ABSTRACT

Polyolefin compositions having good transparency and impact resistance even at low temperatures including (by weight):

A) from 25 to 95 parts of a crystalline random copolymer of propylene with ethylene and/or another α-olefin, containing more than 85% by weight of propylene, and having Haze values lower than 25%; and B) from 5 to 75 parts of a component comprising (a) an elastomeric copolymer of ethylene with propylene and/or another α-olefin, and optionally with minor proportions of a diene, containing 20–80 parts of ethylene, and (b) one or more of the polymers selected from LLDPE, LDPE, HDPE, having a Melt Index higher than 0.5 g/10 min., said (a) and (b) being present in such proportions that the ratio between the density of (A) and calculated average density of (B) is from 0.980 to 1.015.

2 Claims, No Drawings

POLYOLEFIN COMPOSITIONS HAVING GOOD TRANSPARENCY AND IMPACT RESISTANCE

This application is a continuation of application Ser. No. 08/021,365, filed Feb. 23, 1993 now abandoned.

The present invention relates to polyolefin compositions having good transparency and impact resistance even at low temperatures.

There is a strong need in some market sectors, for example in the field of food containers and in the medical and packaging fields, for polyolefin compositions based on polypropylene which have good transparency and high impact resistance even at low temperature. Moreover, in the field of food containers it is desirable that the polyolefin compositions have high rigidity values. In the medical and packaging fields it is also necessary that the polyolefin compositions have a sufficient flexibility.

Good impact resistance is generally obtained by adding a certain quantity of elastomeric olefin copolymer to the polypropylene, such as ethylene-propylene rubber (EPR) for example, but since the refraction index for EPR is different from that for polypropylene, said polyolefin blends are usually opaque, even when both components are transparent initially.

U.S. Pat. No. 4,634,740 (Toa Nenryo) describes with polypropylene compositions comprising from 65% to 95% by weight of crystalline polypropylene, and from 5% to 35% by weight of an ethylene-propylene random copolymer containing 70–85% by weight of ethylene. The mechanical properties of said compositions are satisfactory, but the values of their optical properties (transparency for example) are basically comparable to those of homopolymer polypropylene.

U.S. Pat. No. 4,087,485 (Exxon) describes polypropylene compositions obtained by adding small quantities of a low density polyethylene and an elastomeric ethylene-propylene copolymer to the polypropylene which are at least partially cross-linked to each other. Said compositions have good mechanical properties, but in this case too the transparency values are comparable to the ones of the polypropylene homopolymer.

U.S. Pat. No. 5,023,300 (Exxon) describes polyolefin thermoplastic compositions comprising an elastomeric olefin copolymer, such as ethylene-propylene rubber for example, and a crystalline random propylene-monoolefin (ethylene for example) copolymer. The impact resistance of this type of compositions is satisfactory, but the optical properties are somewhat poor.

Published European patent application EP-A-373 660 in the name of the Applicant is directed to polypropylene compositions comprising (by weight) 70–98% of a crystalline ethylene-propylene random copolymer and/or another α-olefin, and 2–30% of an ethylene-propylene elastomeric copolymer where the values of the intrinsic viscosity of the portion soluble in xylene at ambient temperature of the elastomeric copolymer (I.V.2), the intrinsic viscosity of the crystalline random copolymer (I.V.1), and the content of ethylene in the elastomeric copolymer satisfy a certain relation. Said compositions have good transparency and improved impact resistance at temperatures around 0° C.

Therefore, a contemporaneous achieving of good transparency, rigidity and impact resistence of a polyolefin composition even at low temperature lower than 10° C., seems to be an objective which is hard to reach.

In the medical and packaging fields vinyl chloride polymers containing plastifiers, which are necessary in order to impart the desired flexibility characteristics to said materials, are widely used.

Said polymer products, however, have been the subject of wide and increasing criticism due to both the suspected harmful effects of the plastifiers contained in them, and because during incineration they can release extremely toxic substances into the atmosphere, such as dioxin.

Therefore, it would be greatly advantageous to replace said materials with products capable of combining with the desired mechanical and optical characteristics, those of chemical inertia and nontoxicity typical of olefin polymers.

European patent application EP-A- 0 400 333 (in the name of the Applicant) discloses elastoplastic polypropylene compositions comprising, by weight:

a) 10–60 parts of isotactic polypropylene, or a crystalline random copolymer of propylene with ethylene and/or an α-olefin;

b) 10–40 parts of a polymer fraction containing ethylene, insoluble in xylene at ambient temperature; and c) 30–60 parts of an amorphous ethylene-propylene copolymer fraction soluble in xylene at ambient temperature and containing 40–70% by weight of ethylene.

The above compositions are flexible and display excellent mechanical properties, but do not have good optical properties (transparency).

The Applicant has now found that it is possible to obtain polyolefin compositions which satisfy all the above mentioned needs.

Accordingly, the present invention provides polyolefin compositions with good transparency and impact resistance even at low temperatures comprising (by weight):

A) from 25 to 95 parts of a crystalline random copolymer of propylene with ethylene and/or an α-olefin of formula $CH_2=CHR$, where R is a $C_2$–$C_8$ alkyl radical, containing more than 85% by weight of propylene, preferably from 90 to 99%, having Haze values lower than 25%;

B) from 5 to 75 parts, of a component comprising (a) an elastomeric copolymer of ethylene with propylene and/or α-olefin of formula $CH_2=CHR$, where R is a $C_2$–$C_8$ alkyl radical, and optionally with minor proportions of a diene, containing 20–80 parts of ethylene, and (b) one or more of the polymers selected from the group consisting of LLDPE, LDPE and HDPE having a Melt Index higher than 0.5 g/10 min., preferably higher than 10 g/10 min., said (a) and (b) being present in such proportions that the ratio between the density of (A), ($d_A$), and the calculated average density of (B), ($d_B$), is from 0,980 to 1.015, and preferably from 0.99 to 1.01. The calculated average density is defined as follows:

$$d_B = d_a \cdot X_a + d_b \cdot X_b$$

where $d_a$ and $d_b$ are respectively the density of components (a) and (b) of (B), and $X_a$ and $X_b$ are respectively the volumetric fractions of (a) and (b) in component (B).

By way of example, when the compositions of the present invention are used in the field of food containers, and therefore should have high values of rigidity, component (A) forms preferably from greater than 60 to 95 parts by weight of the composition, component (B) forms preferably from 5 to less than 40 parts by weight of the composition, and from 40 to 70 parts of ethylene.

Said compositions of the present invention, which are particularly suitable for instance in the field of food containers have generally a flexural modulus higher than 600 MPa, Haze lower than 25%, preferably lower than 20%, and a ductile/fragile transition temperature ($T_{ductl/frag}$) lower than −15° C., and generally lower than −25° C.

The ductile/fragile transition temperature is the temperature at which 50% of the specimens show fragile fractures when subjected to the impact of a hammerhead having a given weight, and falling from a given height.

By way of example, when the compositions of the present invention are used in the medical and packaging fields, and therefore should have high values of flexibility, component (A) forms preferably from 25 to 60 parts by weight of the composition, component (B) forms preferably from 40 to 75 parts by weight of the compositions, and elastomeric copolymer (a) contains preferably from 30 to 70 parts of ethylene.

Said compositions of the present invention, which are particularly suitable for instance in the medical and packaging fields, have generally a flexural modulus of from 200 to 600 MPa, Haze smaller than 30%, generally smaller than 25%, and a ductile/fragile transition temperature lower than −40° C., generally lower than −50° C.

Examples of copolymers that can be used as component (A) are: propylene/ethylene, propylene/1-butene, and propylene/4-methyl-1-pentene copolymers. Copolymers (A) with the above mentioned compositions have density values ranging from 885 and 910 Kg/m$^3$. Said copolymers have Haze values lower than 25% when they contain at least 0.20% by weight of a nucleating agent, such as DBS (dibenzylidenesorbitol) for example.

Preferably component (A) is selected from a propylene-ethylene random copolymer containing from 1% to 5% by weight of ethylene, and a propylene-1-butene random copolymer containing from 1% to 6% by weight of 1-butene. For applications in the field of food containers the random propylene-ethylene copolymer contains preferably from 1 to 3% by weight of ethylene and the random propylene-1-butene copolymer contains preferably from 1 to 4% by weight of 1-butene.

Said copolymer which constitutes component (A) has an isotactic index greater than 80, preferably greater than 85.

Examples of α-olefins that can be used for the preparation of the elastomeric component (a) of (B) are, besides propylene, 1-butene, 1-pentene, 4-methyl-1-pentene, 1-hexene, and 1-octene. Preferred are propylene and 1-butene.

Examples of dienes that can be used for the preparation of the component (a) of (B) are 1,4-hexadiene, 1,5-hexadiene, dicyclopentadiene, ethylidenenorbornene, 1,6-octadiene, and vinylnorbornene.

For applications in the field of food containers, preferably the quantity of (a) present in (B) is 2–10 parts by weight with respect to the total composition. For applications in the medical and packaging fields, preferably the quantity of (a) present in (B) is 10–20 parts by weight with respect to the total composition.

Preferably the elastomeric component (a) of (B) has a density ranging from 855 and 865 Kg/m$^3$, and Mooney ML(1+4) viscosity values at 125° C. ranging from 10 to 100.

For applications in the field of food containers, preferably the component (a) of (B) is an ethylene-propylene rubber.

Generally the polyethylenes which can be used as component (b) of (B) have a density greater than 900 Kg/m$^3$, particularly ranging from 910 to 965 Kg/m$^3$.

Each of the components (A), (a) and (b) is available commercially, or can be prepared separately and them mechanically blended in order to prepare the compositions of the present invention. The compositions of the present invention can also be prepared by mechanically blending: 1) copolymer (A), 2) component (b) of (B), and 3) a heterophasic polyolefin composition which comprises both the elastomeric component (a) of (B) and a random copolymer of propylene with ethylene and/or an α-olefin. Composition (3) is included among the ones described in European patent application EP-A-0 472 946, in the name of the Applicant, and moreover, compositions of this type are made available commercially by HIMONT.

The components, in the quantities defined above, are blended with known methods, for example by using a Henschel or a Banbury mixer, or an extruder. As a way of example the mixture is brought to a temperature ranging from 175° C. to 230° C. for a period of time that varies fro 3 to 10 minutes.

Copolymer (A) can be prepared by copolymerizing propylene with ethylene and/or an α-olefin in the presence of stereospecific Ziegler-Natta catalysts supported on active magnesium dihalides. Said catalysts contain a solid catalyst component comprising a titanium compound having at least one titanium-halide bond and an electron-donor compound supported on an active magnesium halide.

Catalysts having the above mentioned characteristics are well known in patent literature.

Particularly suited are the catalysts described in U.S. Pat. No. 4,339,054, and EP patent 45 977. Other examples of catalysts are described in U.S. Pat. Nos. 4,472,524 and 4,473,660.

The solid catalyst components used in these catalysts comprise, as electron-donor compounds, compounds selected from the ethers, ketones, lactones, compounds containing N, P, and/or S atoms, and esters of mono- and dicarboxylic acids.

Particularly suitable are the esters of phthalic acid, such as diisobutyl, dioctyl and diphenylphthalate, and benzyl butyl phthalate; the esters of malonic acid such as diisobutyl and diethyl malonate; the alkyl and aryl pivalates, the alkyl, cycloalkyl, and aryl maleates, the alkyl and aryl carbonates such as diisobutyl carbonate, ethyl-phenyl carbonate, and diphenyl carbonate; the esters of succinic acid such as the mono and diethyl succinate.

Other electron-donors particularly suitable are the 1,3-diethers of formula

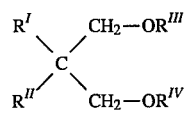

where $R^I$ and $R^{II}$ are the same or different and are alkyl, cycloalkyl or aryl radicals with 1–18 carbon atoms; $R^{III}$ and $R^{IV}$ are the same or different and are alkyl radicals with 1–4 carbon atoms. Ethers of this type are described in published European patent application EP 361 493.

Examples representative of said compounds are 2-methyl-2-isopropyl-1,3-dimethoxypropane, 2,2-diisobutyl-1,3-dimethoxypropane, 2-isopropyl-2-cyclopenthyl-1,3-dimethoxypropane.

The above mentioned catalyst components can be prepared according to various methods.

For example, the magnesium halide (used anhydrous, containing less than 1% water), the titanium compound, and the electron-donor compound can be milled together under conditions where the magnesium halide is activated; the milled product is then treated one or more times with TiCl$_4$ in excess at a temperature ranging from 80° C. and 135° C., and then repeatedly washed with a hydrocarbon (hexane, for example) until all chlorine ions have disappeared.

According to another method the anhydrous magnesium halide is preactivated according to known methods and then reacted with an excess of $TiCl_4$ containing in solution the electron-donor compound. In this case also the operation takes place at a temperature between 80° and 135° C. The treatment with $TiCl_4$ is optionally repeated and the solid is then washed with hexane or another hydrocarbon solvent in order to eliminate all traces of nonreacted $TiCl_4$.

According to another method, a $MgCl_2 \cdot nR^{V}OH$ adduct, particularly in the form of spheroidal particles, where n generally ranges from 1 to 3, and $R^{V}OH$ is ethanol, butanol, isobutanol, is made to react with an excess of $TiCl_4$ containing in solution the electron donor compound. The temperature usually ranges from 80° to 120° C. The solid is then isolated and reacted once more with $TiCl_4$, then separated and washed with a hydrocarbon until all chlorine ions have disappeared.

According to yet another method, magnesium alcoholates and chloroalcoholates (the chloroalcoholates can be prepared particularly as described in U.S. Pat. No. 4,220,554) are reacted with $TiCl_4$ in excess containing in solution the electron-donor compound, operating in this case also under the reaction conditions already described.

In the solid catalyst component, the titanium compound represented by Ti is generally present in a percentage by weight ranging from 0.5 to 10%; the quantity of electron-donor compound which remains fixed on the solid (internal donor) is generally from 5 to 20 mole % with respect to the magnesium dihalide.

The titanium compounds which can be used for the preparation of the catalyst components are halide and halogen alcoholates. Titanium tetrachloride is the preferred compound.

Satisfactory results can be obtained also with titanium trihalides, particularly $TiCl_3$ HR, $TiCl_3$ ARA, and with halogen alcoholates such as $TiCl_3OR^{VI}$ where $R^{VI}$ is a phenyl radical.

The reactions indicated above bring to the formation of activated magnesium halide. In the art, other reactions are known, besides the ones just mentioned, which bring to the formation of activated magnesium halide starting from magnesium compounds different from the halides, such as, for example, magnesium carboxylates.

The active form of the magnesium halides in the solid catalyst components can be recognized by the fact that in the X-ray spectrum of the catalyst component, the maximum intensity reflection which appears in the spectrum of the nonactivated magnesium halides (with a surface area of less than 3 $m^2/g$) is no longer present, but in its place there is a halo with the maximum intensity shifted with respect to the position of the maximum intensity reflection of the nonactivated magnesium halide, or by the fact that the maximum intensity reflection presents a width at half-peak at least 30% greater than the maximum intensity reflection which appears in the spectrum of the nonactivated Mg halide. The most active forms are those where in the X-ray spectrum shown a halo appears.

Chloride is the preferred compound among the magnesium halides. In the case of the most active forms of Mg chloride, the X-ray spectrum of the catalyst component shows a halo in place of the reflection which appears at the distance of 2.56 Å in the spectrum of the nonactivated chloride.

Al-alkyl compounds which can be used as co-catalysts include the Al-trialkyls, such as Al-triethyl, Al-triisobutyl, Al-tri-n-butyl, and linear or cyclic Al-alkyl compounds containing two or more Al atoms bonded to each other by O or N atoms, or by $SO_2$ and $SO_3$ groups.

Examples of said compounds are:

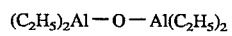

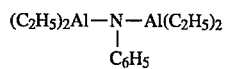

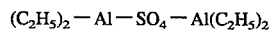

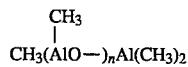

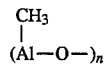

where n is a number from 1 to 20.

One can also use $AlR^{VII}_2OR^{VIII}$ compounds where $R^{VIII}$ is an aryl radical substituted in one or more positions, and $R^{VII}$ is an alkyl radical with 1–6 carbon atoms, and $AlR^{VII}_2H$ compounds where $R^{VII}$ has the above indicated meaning.

The Al-alkyl compound is generally used in such quantities as to cause the Al/Ti ratio to be from 1 to 1000.

The electron-donor compounds that can be used as external donors (added to the Al-alkyl compound) include esters of aromatic acids such as alkyl benzoates, and in particular silicon compounds containing at least one $Si-OR^{IX}$ ($R^{IX}$=hydrocarbon radical), 2,2,6,6-tetramethylpiperidine, and 2,6-diisopropylpiperidine.

Examples of silicon compounds are (tert-butyl)$_2$-Si(OCH$_3$)$_2$, (cyclohexyl)$_2$Si(OCH$_3$)$_2$, (phenyl)$_2$Si(OCH$_3$)$_2$. 1,3-diethers having the formula described above can also be used advantageously. If the internal donor is one of these diethers, the external donors can be omitted.

The composition of the present invention can also be prepared by way of sequential polymerization, where the single components are produced in each one of the subsequent stages. For example, in the first stage one can polymerize propylene with minor quantities of ethylene and/or an α-olefin to form copolymer (A), in the second stage one can polymerize the blends of ethylene with propylene and/or with an α-olefin to form elastomeric component (a) of (B) and in the third stage one polymerizes ethylene, optionally with minor quantities of 1-butene, to form component (b) of (B). In each stage one operates in the presence of the polymer obtained and the catalyst used in the preceding stage.

According to another method, one can prepare two of the components of the compositions of the present invention using two sequential polymerization stages, and then mechanically blend the product of said polymerization with the third component in order to obtain the composition of the present invention. For example, by using a two-stage sequential polymerization one can prepare a blend of the 2 components (a) and (b) of (B), and subsequently add to said composition the (A) component, by mechanical blending as mentioned above.

The polymerization can take place in liquid phase, gas phase, or liquid-gas phase.

The temperature in the various stages of polymerization can be the same or different, and generally ranges from 20° C. to 1000° C.

As molecular weight regulators one can use the traditional chain transfer agents known in the art, such as hydrogen and $ZnEt_2$.

The catalyst used in the sequential polymerization is of the type described above for the preparation of component (A).

The polyolefin compositions which are object of the present invention can be advantageously used for the production of food or drinks containers, and in the medical and packaging fields.

The polyolefin compositions of the present invention, can contain additives, fillers, and dyes commonly used for olefin polymers, such as nucleating agents, extender oils, mineral fillers, organic and inorganic pigments.

The data relating to the following properties which are reported in the Examples and the text have been determined according to the methods below.

| Property | Method |
|---|---|
| Flexural modulus | ASTM - D 790 |
| Notched IZOD impact | ASTM - D 256 |
| Haze | ASTM - D 1003 on 1 mm thick specimens |
| Energy at break | HIMONT internal method MA 17238, available upon request |
| $T_{duct/frag}$ | HIMONT internal method MA 17238, available upon request |

EXAMPLES 1–5 AND 1C–4C

The ethylene-propylene random copolymer, component (A), commercially available from HIMONT under the trademark MOPLEN™ EP 2X29G (having a density of 900.2 Kg/m³, Melt Index L 10 g/10 min., containing 3% by weight of ethylene, and nucleated with 0.24% of DBS), the LLDPE, component (b) of (B), commercially available from Chemie de France under the trademark LOTREX MC-2300 (having a density of 919.2 Kg/m³, Melt Index E 24 g/10 min., and containing 8.8% by weight of 1-butene), and the ethylene-propylene elastomeric copolymer, component (a) of (B), commercially available from Enichem Elastomeri under the trademark CO038 (having a density of 865.4 Kg/m³, Mooney ML (1+4) viscosity at 125° C. of 60, and containing 28% by weight of propylene) are fed at the same time, in the quantities set forth in Table 1, in a 4.2 liter Banbury mixer, sold by Pomini-Farrel, at an average temperature of 185° C. with a filling coefficient of 0.75.

In order to obtain the desired composition percentages in the final mixture, after having selected the type of component (A), (a) and (b), and having decided the percentage of components (A) and (a), the percentage of component (b) is calculated by using the following formulas (1) and (2) in order to satisfy ratio between densities as defined above:

1) $X_b = (d_{A-a}a/d_b - d_A)$, where the symbols have the meanings previously defined; and
2) $\%b = \%a \cdot (X_b) / (1-X_b) \cdot d_a/d_b$, where $\%a$ and $\%b$ represent respectively the percentage compositions by weight of components (a) and (b) with respect to the final composition.

The blending is carried out for 4 minutes. For the first 3 minutes the pressure of the piston is maintained at 4 Kg/cm³, and at the beginning of the fourth minute the piston is lifted. The polymer composition thus obtained is then discharged, and one prepares the specimens used to test the optical and mechanical properties set forth in Table 1. The examples designated as "C" are comparative examples. In evaluating the data reported in Table 1, one can see how critical it is, in order for the polyolefin compositions to have good clarity as well as good mechanical properties, that the values of the $d_A/d_B$ ratio be within the above mentioned range. Generally speaking, one can see the poor optical properties of the binary mixtures of the (A)/(a) type component and the (A)/(b) type component (see Examples 1C. and 4C).

EXAMPLES 6–10 AND 5C–6C

The same procedure of Examples 1–5 is repeated, with the only difference being that the LLDPE used is LOTREX FC-1014 commercially available from Chemie de France, (having a density of 916 Kg/m³, Melt Index E 0.89 g/10 min., and containing 7.4% by weight of 1-butene, instead of the LOTREX MC-2300. The quantities relative to the components for each composition, together with their optical and mechanical properties, are set forth in Table 2.

EXAMPLE 11–14

In Examples 11–14 the same procedure used in Examples 1–5 is repeated, but with the following differences concerning the single components used:

in Example 11, as elastomeric component (a) of (B) one uses the ethylene-propylene rubber marketed by Enichem Elastomeri under the tradename CTX 053 (having a density of 857 Kg/m³, Mooney ML (1+4) viscosity at 100° C. of 43, and containing 44% by weight of propylene);

in Example 12, as component (b) of (B) one uses the LDPE marketed by Enichem Polimeri under the trademark RIBLENE MR10 (having a density of 915 Kg/m³, Melt Index E 20 g/10 min), and as component (a) of (B), the ethylene-propylene rubber marketed by Enichem Elastomeri under the trademark CO058 (having a density of 855 Kg/m³, Mooney ML(1+4) viscosity at 100° C. of 80, and containing 50% by weight of propylene);

in Example 13 and 14, as component (A) one uses the propylene-ethylene random copolymer marketed by HIMONT under the trademark MOPLEN™ EP 2S29B (having a density of 899.4 Kg/m³, Melt Index L 1.8 g/10 min., containing 3% by weight of ethylene, and nucleated with 0.24% of DBS); moreover, in Ex. 14, as component (a) of (B) one uses the CO058 rubber. Unless specified to the contrary, components (A), (a), and (b) are going to be the same as the ones used in Examples 1–5.

The quantities relative to the components of each compositions, together with optical & mechanical properties of each composition obtained are set forth in Table 3.

EXAMPLES 15–18

The mixing process used for Examples 1–5 is repeated, except using the following components:

in Example 15, component (A) is EP 2524B, propylene-ethylene random copolymer, component (b) of (B) is HERACLENE MS80, the HDPE marketed by Enichem Polimeri (having a density of 952 Kg/m³, Melt Index E 25 g/10 min.), and the elastomeric component (a) of (B) is CO058 rubber;

in Example 16, component (A) is EP 298, propylene-ethylene random copolymer component (b) of (B) is LOTREX 2300, a LLDPE, and the third component is heterophasic composition marketed by HIMONT under the trademark HIFAX 7030 (containing 65% of elastomeric copolymer, component (a), which has a density of 863 Kg/m³ and contains 30% by weight of ethylene, and 35% of a propylene-ethylene random copolymer having the same density as the EP 2S29B);

in Examples 17 and 18, as component (A) one uses the propylene-ethylene random copolymer marketed by HIMONT under the trademark MOPLEN™ EP 1X35F (having a density of 900.7 Kg/m³, Melt Index L 8 g/10 min., and containing 2% by weight of ethylene), as component (b) of (B) the LOTREX 2300, a LLDPE and as component (a) of (B) the CO043 rubber (marketed by Enichem Elastomeri, having a density of 855.6 Kg/m³, Mooney ML(1+4) viscosity at 100° C. of 34, and containing 45% by weight of propylene) for Example 17, and CO038 rubber for Example 18.

The quantities relative to the components in each composition, together with the optical and mechanical properties of each composition obtained, are set forth in Table 4.

EXAMPLES 19–24

In examples 19 and 20, the ethylene-propylene random copolymer [component (A)]marketed by HIMONT under the trademark MOPLEN™ EP 2X29G (having a density of 900.2 Kg/m³, Melt Index L 10 g/10 min., containing 3% by weight of ethylene, and nucleated with 0.24% of DBS), the LDPE [component (b) of (B)] marketed by Enichem Polimeri under the trademark RIBLENE MV-10 (having a density of 913 Kg/m³, Melt Index E 60 g/10 min.), and the ethylene-propylene elastomeric copolymer [component (a) of (B)] marketed by Enichem Elastomers under the trademark COO58 (having a density of 855 Kg/m³, Mooney ML(1+4) viscosity at 100° C. of 80, and containing 50% by weight of propylene), are fed at the same time, in the quantities set forth in Table 5, in a 4.2 liter Banbury mixer, sold by Pomini-Farrel, at an average temperature of 185° C. with a filling coefficient of 0.75.

The operation described above is repeated for Example 21, with the only difference that as component (b) of (B) one uses the LDPE marketed by Enichem Polimeri under the trademark of RIBLENE MR 10 (having a density of 915 Kg/m³, and Melt Index E of 20 g/10 min.).

The operation described for Example 21 is repeated for Example 22, with the only difference that as elastomeric component (a) of (B) one uses the ethylene-propylene rubber marketed by Enichem Elastomeri under the trademark COO38 (having a density of 865.4 Kg/m³, Mooney ML(1+4) viscosity at 125° C. of 60, and containing 28% by weight of propylene).

The operation described for Examples 19 and 20 is repeated for Example 23, with the only difference that as elastomeric component (a) of (B) one uses the ethylene-propylene rubber marketed by Enichem Elastomeri under the trademark of CS18/89 (having a density of 854.5 Kg/m³, Mooney ML(1+4) viscosity at 125° C. of 105, and containing 45% by weight of propylene), and as component (b) of (B), one uses the LLDPE marketed by Chemie de France under the trademark LOTREX MC-2300 (having a density of 919.2 Kg/m³ Melt Index E of 24 g/10 min., and containing 8.8% of 1-butene).

The operation described above for Examples 19 and 20 is repeated for Example 24, with the difference that as elastomeric component (a) of (B) one uses the ethylene-propylene rubber marketed by Enichem Elastomeri under the trademark COO59 (having a density of 855.7 kg/m³, Mooney ML(1+4) viscosity at 125° C. of 79, and containing 42% by weight of propylene).

In order to obtain the desired composition percentages in the final mixture, after having selected the type of component (A), (a) and (b), and having decided the percentage of components (A) and (a), the percentage of component (b) is calculated by using the following formulas (1) and (2) in order to satisfy the ratio between densities as defined above:

1) $X_b = (d_A - d_a / d_b - d_A)$, where the symbols have the meanings previously defined; and 2) $\%b = \%a \cdot (X_b) / (1 - X_b) \cdot d_a / d_b$, where %a and %b represent respectively the percentage compositions by weight of components (a) and (b) with respect to the final composition.

The blending is carried out for 4 minutes: for the first 3 minutes the pressure of the piston is maintained at 4 Kg/cm³, and at the beginning of the fourth minute the piston is lifted. The polymer composition thus obtained is then discharged, and one prepares the specimens used to test the optical and mechanical properties set forth in Table 5.

TABLE 1

| Ex. N. | 1 | 2 | 3 | 4 | 5 | 1C | 2C | 3C | 4C |
|---|---|---|---|---|---|---|---|---|---|
| Component (A) | 70 | 70 | 70 | 70 | 70 | 70 | 70 | 70 | 70 |
| Component (b) | 18.0 | 19.81 | 21.0 | 24.0 | 27.0 | — | 4.5 | 9.0 | 30.0 |
| Component (a) | 12.0 | 10.19 | 9.0 | 6.0 | 3.0 | 30.0 | 25.5 | 21.0 | — |
| $d_A/d_B$ | 1.004 | 1.000 | 0.998 | 0.992 | 0.985 | 1.040 | 1.031 | 1.022 | 0.979 |
| Flex. modul. (MPa) | 760 | 770 | 780 | 810 | 830 | 700 | 720 | 740 | 900 |
| Haze (%) | 23 | 20 | 19.5 | 19 | 23 | 98 | 92 | 66 | 31.5 |
| $T_{duct/frag}$ (°C.) | −48 | −50 | −45 | −36 | −32 | <−60 | <−60 | <−60 | −13 |

TABLE 2

| Ex. N. | 6 | 7 | 8 | 9 | 10 | 5C | 6C |
|---|---|---|---|---|---|---|---|
| Component (A) | 70 | 70 | 70 | 70 | 70 | 70 | 70 |
| Component (b) | 18.0 | 20.0 | 20.99 | 22.0 | 24.0 | 9.0 | 30 |
| Component (a) | 12.0 | 10.0 | 9.01 | 8.0 | 6.0 | 21.0 | — |
| $d_A/d_B$ | 1.006 | 1.002 | 1.000 | 0.998 | 0.994 | 1.023 | 0.983 |
| Flex. modul. (MPa) | 840 | 835 | 830 | 915 | 920 | 785 | 1080 |
| Haze (%) | 23.4 | 22.7 | 22.3 | 23.3 | 25.1 | 71.1 | 38.5 |
| $T_{duct/frag}$ (°C.) | −58 | −54 | −52 | −51 | −41 | <−60 | <−35 |

TABLE 3

| Ex. No. | 11 | 12 | 13 | 14 |
|---|---|---|---|---|
| Component (A) | 60.0 | 74.4 | 83.1 | 79.5 |
| Component (b) | 28.0 | 19.6 | 10.9 | 14.5 |
| Component (a) | 12.0 | 6.0 | 6.0 | 6.0 |
| $d_A/d_B$ | 1.000 | 1.000 | 1.000 | 1.000 |
| Flex. Modulus (MPa) | 650 | 670 | 920 | 880 |
| Haze (%) | 25.4 | 15.1 | 16.5 | 16.2 |
| $T_{duct/frag}$ (°C.) | −53 | −26 | −22 | −25 |
| Energy at break 0° C. (J) | — | — | 11.6 | — |
| Energy at break −10° C. (J) | — | — | 8.0 | 11.8 |
| Energy at break −20° C. (J) | — | 10.0 | 0.3 | 11.8 |

TABLE 4

| Ex. No. | 15 | 16 | 17 | 18 |
|---|---|---|---|---|
| Component (A) | 88.79 | 80.2 | 76.0 | 70.0 |
| Component (b) | 5.21 | 12.0 | 16.0 | 20.0 |
| Component (a) | 6.0 | 7.8 | 8.0 | 10.0 |
| $d_A/d_B$ | 1.002 | 1.003 | 1.000 | 1.000 |
| Flex. Modulus (MPa) | 970 | 630 | 910 | 840 |
| IZOD (−20° C.) (J/m) | — | — | 14.4 | 17.0 |
| Energy at break (−20° C.) (J) | — | — | 9.6 | 11.6 |
| Haze (%) | 16.4 | 16.1 | 21.5 | 22.8 |
| Tduct/frag (°C.) | −16.5 | −24.5 | −34.6 | −37.8 |

TABLE 5

| Ex. No. | 19 | 20 | 21 | 22 | 23 | 24 |
|---|---|---|---|---|---|---|
| Component (A) | 44.0 | 30.0 | 49.0 | 58.0 | 57.0 | 43.0 |
| Component (b) | 44.0 | 55.0 | 39.0 | 30.0 | 31.0 | 45.0 |
| Component (a) | 12.0 | 15.0 | 12.0 | 12.0 | 12.0 | 12.0 |
| $d_A/d_B$ | 1.000 | 1.000 | 1.000 | 1.000 | 1.004 | 1.000 |
| Flex. modul. (MPa) | 357 | 280 | 415 | 560 | 570 | 380 |
| Haze (%) | 18.3 | 24.0 | 17.3 | 18.1 | 25.9 | 20.3 |
| $T_{duct/frag}$ (°C.) | <−60 | <−60 | −59 | −46 | −57 | −59 |

We claim:

1. A polyolefin composition comprising (by weight):

A) from 25 to 60 parts of a crystalline random copolymer of propylene with ethylene and/or an α-olefin of formula $CH_2=CHR$, wherein R is a $C_2-C_8$ alkyl radical, said copolymer containing more than 85% by weight of propylene, and having a haze value lower than 25%;

B) from 40 to 75 parts of a component comprising (a) an elastomeric copolymer of ethylene with propylene and/or α-olefin of formula $CH_2=CHR$, wherein R is a $C_2-C_8$ alkyl radical, and optionally with minor proportions of a diene, containing 30–70 parts of ethylene, and (b) one or more of the polymers selected from the group consisting of LLDPE, LDPE and HDPE having a Melt Index higher than 0.5 g/10 min., said (a) and (b) being present in such proportions that the ratio between the density $d_A$ of (A) and the calculated average density $d_B$ of (B) is comprised from 0.980 to 1.015, and said elastomeric copolymer (a) being present in an amount of 10–20 parts with respect to the total composition, said polyolefin composition having a haze value of less than 30%, as measured according to ASTM-D 1003 on a 1 mm thick sample.

2. The polyolefin composition of claim 1, where component (A) is selected from a propylene-ethylene random copolymer containing from 1% to 3% by weight of ethylene, and a propylene-1-butene random copolymer containing from 1% to 4% of 1-butene.

* * * * *